United States Patent
Sundt et al.

(10) Patent No.: US 8,014,275 B1
(45) Date of Patent: Sep. 6, 2011

(54) DEVICES, SYSTEMS, AND/OR METHODS FOR MONITORING IP NETWORK EQUIPMENT

(75) Inventors: Mark Sundt, Red Bank, NJ (US); James Uttaro, Staten Island, NY (US)

(73) Assignee: AT&T Intellectual Property I, L.P., Reno, NV (US)

( * ) Notice: Subject to any disclaimer, the term of this patent is extended or adjusted under 35 U.S.C. 154(b) by 185 days.

(21) Appl. No.: 12/334,605

(22) Filed: Dec. 15, 2008

(51) Int. Cl.
*H04J 3/14* (2006.01)
(52) U.S. Cl. .................. 370/217; 370/227; 370/228
(58) Field of Classification Search .............. 370/221, 370/216, 217, 225, 227, 228
See application file for complete search history.

(56) References Cited

U.S. PATENT DOCUMENTS

| | | | |
|---|---|---|---|
| 7,333,438 B1 * | 2/2008 | Rabie et al. | 370/242 |
| 2002/0167898 A1 * | 11/2002 | Thang et al. | 370/216 |
| 2005/0050377 A1 | 3/2005 | Chan | |
| 2006/0126495 A1 | 6/2006 | Guichard | |
| 2006/0153067 A1 * | 7/2006 | Vasseur et al. | 370/217 |
| 2006/0215577 A1 | 9/2006 | Guichard | |
| 2007/0061282 A1 | 3/2007 | Ganguly | |
| 2007/0091796 A1 | 4/2007 | Filsfils | |
| 2007/0171817 A1 | 7/2007 | Fujita | |
| 2008/0091822 A1 | 4/2008 | Sheinfeld | |
| 2008/0198849 A1 * | 8/2008 | Guichard et al. | 370/392 |
| 2008/0298256 A1 * | 12/2008 | Matsubara et al. | 370/242 |

\* cited by examiner

*Primary Examiner* — Hassan Kizou
*Assistant Examiner* — Siming Liu
(74) *Attorney, Agent, or Firm* — Akerman Senterfitt; Michael K. Dixon

(57) ABSTRACT

Certain exemplary embodiments can provide a method, which can comprise, from a central routing device of a plurality of central routing devices, automatically polling each of a plurality of Provider Edge routers with Bidirectional Forwarding Detection protocol messages. The method can comprise automatically determining a suspected failure of a Provider Edge router of the plurality of Provider Edge routers.

13 Claims, 14 Drawing Sheets

DEVICES, SYSTEMS, AND/OR METHODS FOR MONITORING IP NETWORK EQUIPMENT

CROSS-REFERENCES TO RELATED APPLICATIONS

This application is related to, and incorporates by reference herein in its entirety, pending U.S. Non-Provisional patent application Ser. No. 12/283,334, filed 11 Sep. 2008. This application is related to, and incorporates by reference herein in its entirety, pending U.S. Non-Provisional patent application Ser. No. 12/286,478, filed 30 Sep. 2008.

BACKGROUND

United States Patent Publication 2008/0091822 (Sheinfeld), which is incorporated by reference herein in its entirety, allegedly discloses, "[t]echniques for accurate determination of service impact are provided by provisioning network deployed probes with actual business object information related to business entities, such as VPN sites. Such probes are capable of sending a network trap (or alarm) containing actual business information in response to detecting a loss of connectivity. As a result, service impact caused by the loss of connectivity may be determined accurately by simply parsing the contents of a network trap, thus avoiding the complication and inaccuracy of conventional impact analysis." See Abstract.

United States Patent Publication 2006/0215577 (Guichard), which is incorporated by reference herein in its entirety, allegedly discloses, a "system and method for aggregating performance characteristics for core network paths allows computation of message traffic performance over each of the available candidate paths through the core for identifying an optimal core network path. Particular network traffic, or messages, include attributes indicative of performance, such as transport time, delay, jitter, and drop percentage, over individual hops along the candidate path. A diagnostic processor parses these messages to identify the attributes corresponding to performance, and analyzes the resulting parsed routing information to compute an expected performance, such as available bandwidth (e.g. transport rate) over the path. Messages including such attributes may include link state attribute (LSA) messages, diagnostic probe messages specifically targeted to enumerate such attributes, or other network suitable network traffic. In a particular configuration, the messages may be Path Verification Protocol (PVP) messages." See Abstract.

United States Patent Publication 2007/0091796 (Filsfils), which is incorporated by reference herein in its entirety, allegedly discloses, a "method of implementing a backup path in an autonomous system (AS) for failure of an inter-AS link is described. The method comprises forwarding data elements destined for the failed link via a backup path and including a loop prevention attribute in the packet." See Abstract.

SUMMARY

Certain exemplary embodiments can provide a method, which can comprise, from a central routing device of a plurality of central routing devices, automatically polling each of a plurality of Provider Edge routers with Bidirectional Forwarding Detection protocol messages. The method can comprise automatically determining a suspected failure of a Provider Edge router of the plurality of Provider Edge routers.

BRIEF DESCRIPTION OF THE DRAWINGS

A wide variety of potential practical and useful embodiments will be more readily understood through the following detailed description of certain exemplary embodiments, with reference to the accompanying exemplary drawings in which.

DETAILED DESCRIPTION

Figure 1:
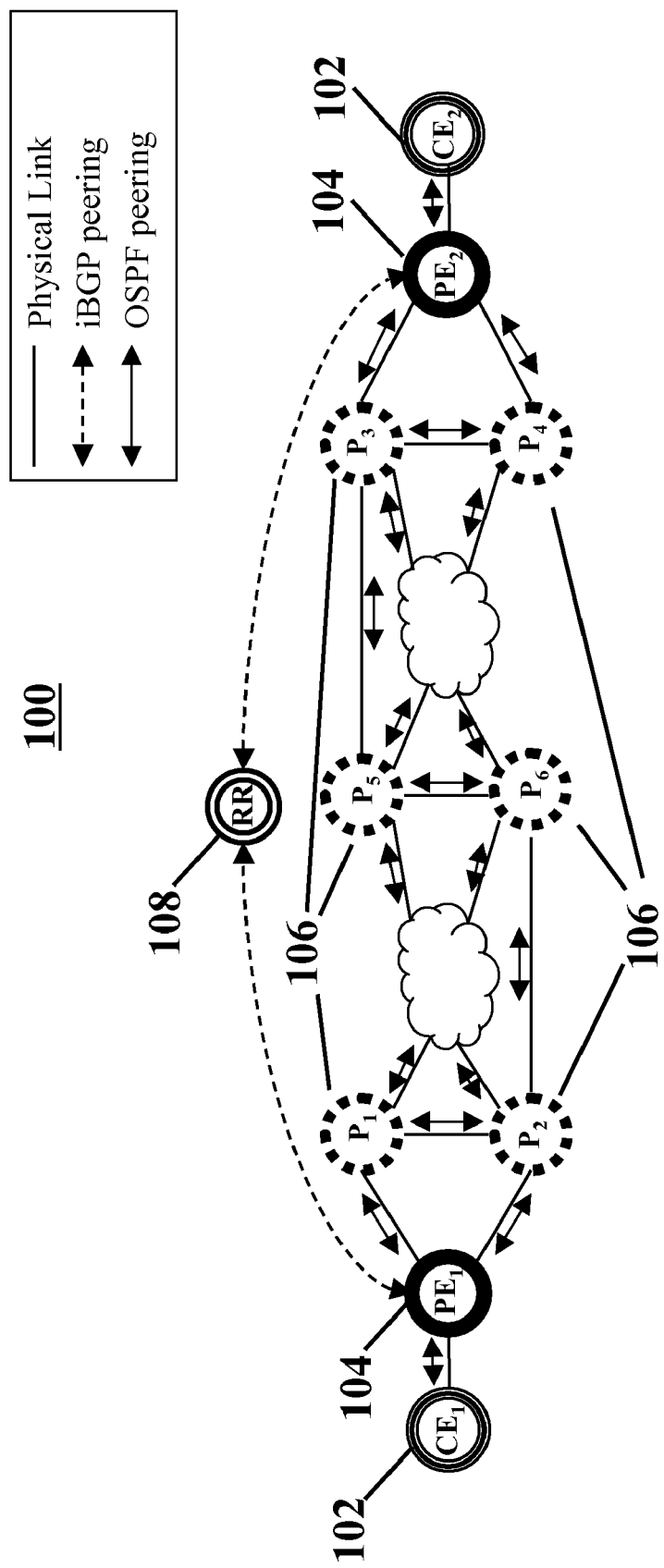
FIG. 1 is a schematic of an illustrative communication network.

Certain exemplary embodiments can provide a method, which can comprise, from a central routing device of a plurality of central routing devices, automatically polling each of a plurality of Provider Edge routers with Bidirectional Forwarding Detection protocol messages. The method can comprise automatically determining a suspected failure of a Provider Edge router of the plurality of Provider Edge routers.

The use of Computing Devices (CDs) and computer networks can be an integral part of personal, corporate and government communication. As used herein, the phrase network means a communicatively coupled plurality of nodes, communication devices, and/or information devices. Via a network, such devices can be linked, such as via various wireline and/or wireless media, such as cables, telephone lines, power lines, optical fibers, radio waves, and/or light beams, etc., to share resources (such as printers and/or memory devices), exchange files, and/or allow electronic communications therebetween. As used herein, the phrase via means by way of and/or utilizing. A network can be and/or can utilize any of a wide variety of sub-networks and/or protocols, such as a circuit switched, public-switched, packet switched, connection-less, wireless, virtual, radio, data, telephone, twisted pair, POTS, non-POTS, DSL, cellular, telecommunications, video distribution, cable, terrestrial, microwave, broadcast, satellite, broadband, corporate, global, national, regional, wide area, backbone, packet-switched TCP/IP, IEEE 802.03, Ethernet, Fast Ethernet, Token Ring, local area, wide area, IP, public Internet, intranet, private, ATM, Ultra Wide Band (UWB), Wi-Fi, BlueTooth, Airport, IEEE 802.11, IEEE 802.11a, IEEE 802.11b, IEEE 802.11g, X-10, electrical power, multi-domain, and/or multi-zone sub-network and/or protocol, one or more Internet service providers, and/or one or more information devices, such as a switch, router, and/or gateway not directly connected to a local area network, etc., and/or any equivalents thereof.

As used herein, the phrase device means a machine, manufacture, and/or collection thereof. As used herein, the phrase not means a negation of something. A computer network can be a collection of physically distributed sub-networks, such as local area networks (LANs) that transport data between network nodes. As used herein, the phrase data means distinct pieces of information, usually formatted in a special or pre-determined way and/or organized to express concepts, and/or represented in a form suitable for processing by an information device. As used herein, the phrase information means facts, terms, concepts, phrases, expressions, commands, numbers, characters, and/or symbols, etc., that are related to a subject. Sometimes used synonymously with data, and sometimes used to describe organized, transformed, and/or processed data. It is generally possible to automate certain activities involving the management, organization, storage, transformation, communication, and/or presentation of information.

As used herein, the phrase router means a device adapted to direct traffic and/or determine the next network point to which a data packet should be forwarded enroute toward its destination. The router can be connected to at least two networks and can determine which way to send each data packet based on its current understanding of the state of the networks it can be connected to. Routers can create and/or maintain a table of the available routes and use this information to determine the best route for a given data packet. Examples include a router, route-reflector, route server, server-based router, router-switch, sets of routers, and/or intra-networking devices, etc. A router can operate at least at the bottom 3 layers (Physical, Link, and Network layers) of the OSI model. As used herein, the phrase set means a related plurality of predetermined elements; and/or one or more distinct items and/or entities having a specific common property or properties.

As used herein, the phrase information device means any device capable of processing data and/or information, such as any general purpose and/or special purpose computer, such as a personal computer, workstation, server, minicomputer, mainframe, supercomputer, computer terminal, laptop, wearable computer, and/or Personal Digital Assistant (PDA), mobile terminal, Bluetooth device, communicator, "smart" phone (such as an iPhone and/or Treo-like device), messaging service (e.g., Blackberry) receiver, pager, facsimile, cellular telephone, a traditional telephone, telephonic device, a programmed microprocessor or microcontroller and/or peripheral integrated circuit elements, an ASIC or other integrated circuit, a hardware electronic logic circuit such as a discrete element circuit, and/or a programmable logic device such as a PLD, PLA, FPGA, or PAL, or the like, etc. In general any device on which resides a finite state machine capable of implementing at least a portion of a method, structure, and/or or graphical user interface described herein may be used as an information device. An information device can comprise components such as one or more network interfaces, one or more processors, one or more memories containing instructions, and/or one or more input/output (I/O) devices, one or more user interfaces coupled to an I/O device, etc.

As used herein, the phrase network interface means any physical and/or logical device, system, and/or process capable of coupling an information device to a network. Exemplary network interfaces comprise a telephone, cellular phone, cellular modem, telephone data modem, fax modem, wireless transceiver, Ethernet card, cable modem, digital subscriber line interface, bridge, hub, router, or other similar device, software to manage such a device, and/or software to provide a function of such a device. As used herein, the phrase provide means to furnish, supply, give, convey, send, and/or make available. As used herein, the phrase instructions means directions, which can be implemented as firmware and/or software, the directions adapted to perform a particular operation or function. As used herein, the phrase interface means (n) a boundary across which two independent systems meet and act on and/or communicate with each other. (v) to connect with and/or interact with by way of an interface.

A node can be loosely defined as device adapted to send and/or receive data in the computer network. As used herein, the phrase receive means to gather, take, acquire, obtain, accept, get, and/or have bestowed upon. As used herein, the phrase define means to establish the meaning, relationship, outline, form, and/or structure of; and/or to precisely and/or distinctly describe and/or specify. Therefore, a node can be the source of data to be transported, the destination for data being transported, and/or a location through which data can travel on its way from source to destination. As used herein, the phrase from means used to indicate a source.

Network topology can be the representation and arrangement of network elements, including links and nodes, and the physical and logical interconnections between nodes. A LAN can be an example of a network that exhibits both a physical topology and a logical topology. Any given node in a LAN can have one or more physical links to one or more other nodes in the network typically through one or more intermediate nodes, such as routers and switches, thus defining the physical topology. Likewise, the mapping of the flow of data between the nodes in the network can determine the logical topology of the network. As used herein, the phrase determine means to obtain, calculate, decide, deduce, establish, and/or ascertain. The physical and logical topologies might be identical in any particular network, but they also can be different.

Data can be exchanged via intra-network communications, that can be within one network, and can also be exchanged between inter-networks, that can be between neighboring (i.e., adjacent) networks. In that regard, "edge devices" located at the logical outer boundaries of the computer network can be adapted to send and receive inter-network communications. Both inter-network and intra-network communications can be effected by exchanging discrete packets of data according to predefined protocols. As used herein, the phrase packet means a generic term for a bundle of data organized in a specific way for transmission, such as within and/or across a network, such as a digital packet-switching network, and comprising the data to be transmitted and certain control information, such as a destination address. As used herein, the phrase transmit means to provide, furnish, supply, send as a signal, and/or to convey (e.g., force, energy, and/or information) from one place and/or thing to another. As used herein, the phrase transmission means a conveyance of information from one location to another. In this context, a protocol consists of a set of rules defining how network nodes interact with each other. As used herein, the phrase each means every one of a group considered individually.

FIG. 1 is a schematic of an illustrative Virtual Private Network (VPN) 100. A VPN can be a computer network that can be a collection of network nodes that establish private communications over a shared backbone network. As used herein, the phrase backbone network means a "transit" network, often made up of long-distance telephone trunk lines and/or other wired and/or wireless links such as microwave and satellite links, adapted for transmitting large amounts of data simultaneously between host computer systems connected to the Internet. Normal communicated data typically neither originates nor terminates in a backbone network. As used herein, the phrase connect means physically or logically join, link, couple, and/or fasten two or more entities. As used herein, the phrase communicate means to exchange information. VPNs can effectively tunnel through another network for security reasons or to separate traffic from various users. Routing devices, generically referred to by their primary purpose, such as customer edge routers, core routers and the like, can utilize a defined protocol that can specify how routers can communicate with other routers to receive and send information via selected routes between nodes on a network. As used herein, the phrase route means (n.) a path along which information, such as packets, can be sent. The term routing protocol can refer more specifically to a protocol operating at Layer 3 of the OSI model, which can distribute network topology information among routers.

Referring to FIG. 1, Customer Edge ($CE_1$ and $CE_2$) routers 102 located at a customer premises, can be connected to Provider Edge ($PE_1$ and $PE_2$) routers 104 of a service provider Internet Protocol/Multiple Protocol Label Switching (IP/MPLS) network. CE routers can communicate and/or peer with the PE routers through a corresponding Virtual Routing and Forwarding (VRF) attachment circuit. The PE router can reside between one network service provider's area and areas administered by other network providers.

In Multi-Protocol Label Switching (MPLS) networks, a P router (106), which can be referred to as a provider core router, can be a Label Switch Router (LSR) that functions as a transit router of the core network. A PE router can be connected to one or more P routers. In the illustrative network 100 of FIG. 1, six P routers 106 ($P_1, P_2, P_3, \ldots P_6$) are shown, with each PE router 104 ($PE_1, PE_2$), can be connected by a physical link to core routers $P_1, P_2$ and $P_3, P_4$, respectively.

The provider edge routers 104 ($PE_1, PE_2$) can utilize the internal Border Gateway Protocol (iBGP) to exchange routing information. The routing information can include destination addresses prefixes and associated path attributes. The routing information via iBGP can be exchanged via a Route Reflector (RR) 108. An Interior Gateway Protocol (IGP) can be then employed to resolve traffic routing within an autonomous system, here shown as the paths between the provider edge routers 104 ($PE_1, PE_2$) via the core routers 106 ($P_1, P_2, P_3, \ldots P_6$). As used herein, the phrase Interior Gateway Protocol means a routing protocol that can be used to determine routes for messages within an autonomous system. As used herein, the phrase message means a communication. One type of IGP can be a link-state routing protocol which include the open shortest path first (OSPF) and the intermediate system-to-intermediate system (IS-IS) protocols. In link-state routing protocols, each node can possess information about the complete network topology. Each node can independently calculate the best path or next hop from it for every possible destination in the network using local information of the topology. The collection of best next hops can form the routing table for the node. Another type of IGP can be a distance-vector routing protocol, which can work by having each router advertise its distances from other routers and receiving similar advertisements from other routers such that each router populates its routing table. This process can continue in cycles until the routing tables of each router converge to stable values.

The Link-state advertisement (LSA) can be a basic communication means of the OSPF routing protocol. It can advertise and/or communicate the router's local routing topology to all other local routers in the same OSPF area. OSPF can be designed for scalability, so some LSAs might not be flooded out on all peered links, but only on those that belong to the appropriate area. In this way detailed information can be kept localized, while summary information can be flooded to the rest of the network. Nevertheless, as provider edge routers can be added to the network, a very large amount of state information needs to be maintained.

Figure 2:
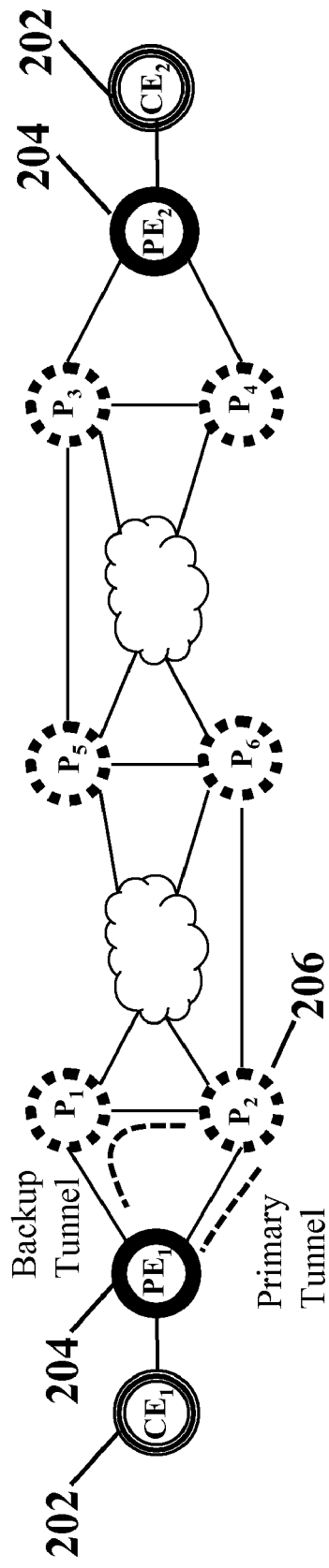
FIG. 2 is a schematic of an illustrative communication network utilizing fast reroute tunnels between PE and P routers.

In current networks, where every node can be treated as an equal IGP peer, every link failure, including a PE-P link failure, can cause a network-wide reconvergence event. As used herein, the phrase fail means to determine, designate, and/or treat as functioning improperly and/or inoperative. As used herein, the phrase failure means a cessation of proper functioning or performance. The current methodology for minimizing outages from link failures can be known as MPLS Fast Re-Route (FRR). With reference to FIG. 2, in accordance with FRR, a primary tunnel can be established between core router 206 $P_2$ and provider edge router 204 $PE_1$. As used herein, the phrase Provider Edge router means a device in a network of a provider of telecommunications services that can be communicatively coupled to a device in a network of a customer of telecommunication services. A backup tunnel for $P_2$-$P_1$-$PE_1$ can be preconfigured in the event of a primary tunnel failure. However, such in such tunnels PE routers can be part of the IGP. When a primary tunnel fails (i.e., the link between $P_2$ and $PE_1$), traffic can be automatically sent through the preconfigured backup tunnel. Additionally, a network-wide IGP reconvergence event can be thereafter triggered due to the physical ink failure that caused the primary tunnel failure, which can cause additional traffic to be rerouted and another traffic hit.

Figure 3:
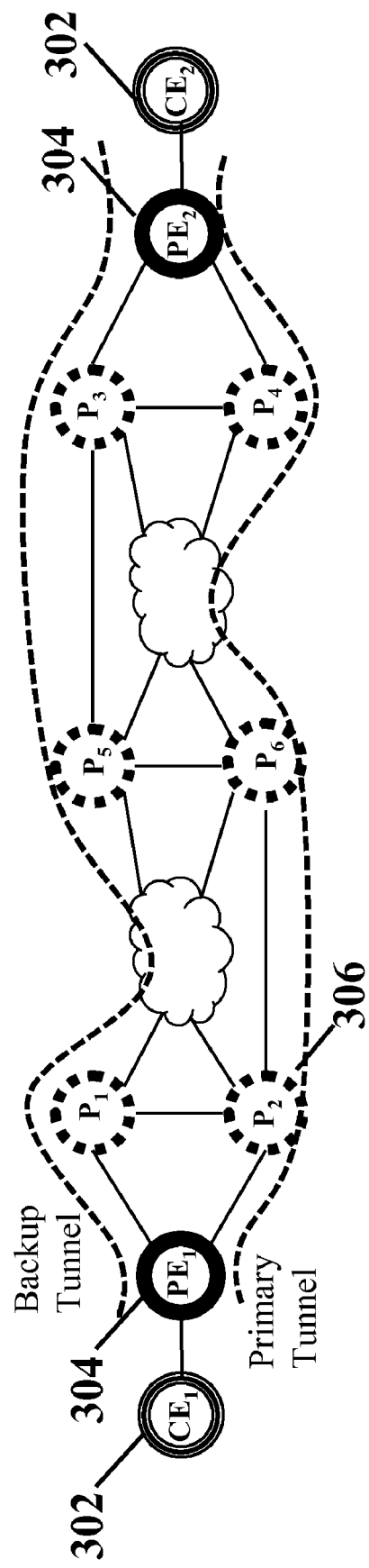
FIG. 3 is a schematic of an illustrative communication network utilizing full mesh of fast reroute tunnels between all PE routers.

FIG. 3 shows a full mesh of Fast Re-Route tunnels between routers $PE_2$ and $PE_1$ 304 via a defined set of core routers 306. In accordance with this configuration, a primary tunnel can be established for steady-state traffic flow utilizing core routers 306, $P_4$-$P_6$-$P_2$. Additionally, a backup tunnel utilizing core routers 306, $P_3$-$P_5$-$P_1$ can be established in the event of a primary tunnel failure. Furthermore the process of establishing primary and backup tunnel can be repeated for all other PEs in a given network. Label distribution Protocol (LDP) can be a protocol which relies on underlying routing information provided by the IGP in order to forward label packets which can be ultimately used to forward traffic through MPLS networks. As used herein, the phrase forward means to send on to and/or toward a subsequent destination and/or address. As used herein, the phrase subsequent means following in time. The tunnels, both primary and backup, can be setup automatically or statically. When the primary tunnel fails, traffic can be automatically sent through the backup tunnel. Just as in the case of MPLS Fast Re-Route (FRR) of FIG. 2, when a full mesh of Fast Re-Route tunnel configuration of FIG. 3 can be utilized, and when the primary tunnel fails, traffic can be automatically sent through the preconfigured backup tunnel and a network-wide IGP reconvergence event can be thereafter triggered, causing additional traffic to be rerouted and another traffic hit.

It would therefore be desirable to eliminate reconvergence events for PE-P link failures by taking advantage of an architecture having a pre-defined "mated pair" of core routers for each PE router where the PE-P links reside outside of the IGP.

It would therefore be desirable to provide a system and method for segmenting the IGP routing information between the provider edge and core routers. Such an arrangement can reduce signaling and messaging overhead and traffic associated with the PE routers by not including the PE routers in the IGP. Thus, the number of LSAs can be reduced by an order of magnitude, thereby enabling massive scaling of IGP infrastructures.

Exemplary embodiments will be described with reference to the accompanying drawing figures wherein like numbers represent like elements. As used herein, the phrase wherein means in regard to which; and; and/or in addition to. As used herein, the phrase comprise means to include but not be limited to, what follows.

Figure 4:
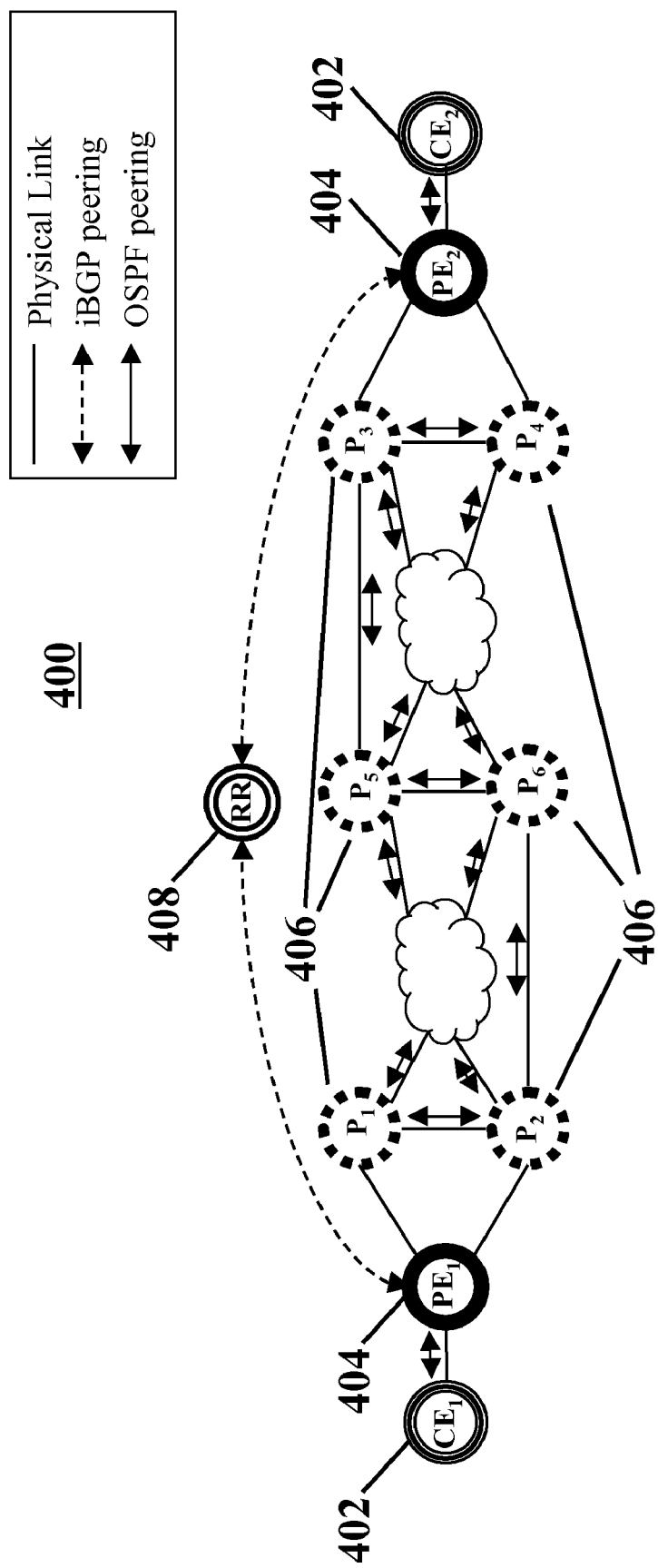
FIG. 4 is a schematic of a communication network of an exemplary embodiment.

Referring now to FIG. 4, there is depicted an illustrative schematic diagram of a network 400 comprising a pair of Customer Edge (CE) routers 402 ($CE_1$, $CE_2$) coupled to a pair of Provider Edge (PE) routers 404 ($PE_1$, $PE_2$) at edges of a Multi-Protocol Label Switching (MPLS) autonomous system including a plurality of core routers (P) 406 ($P_1, P_2, P_3, \ldots P_6$). As used herein, the phrase plurality means the state of being plural and/or more than one. In the example shown, a VPN is depicted, which can employ a VPNv4 route reflector (RR) 408 for exchanging route information between an ingress PE router and an egress PE router relative to the core via the internal Border Gateway Protocol (iBGP). The PE routers in this can cooperate to establish a logical peer connection (session). iBGP can be an inter-domain routing protocol that typically operates over a reliable transport protocol such as TCP to establish a TCP connection between routing peers within the autonomous system. Each route between the PE routers 404 ($PE_1$, $PE_2$) that can be advertised by the iBGP can have a next hop address that can be reachable through an Internal Gateway Protocol (IGP) in order for such route to be considered valid. As discussed above, the IGP can be a link state or distance-vector protocol. In accordance with an exemplary embodiment, the PE routers 404 ($PE_1$, $PE_2$) might not share state information with the core routers 406 ($P_1, P_2, P_3, \ldots P_6$), and can be thus removed from the IGP process.

As shown in FIG. 4, the ingress PE router and egress PE router can be each coupled via a physical link to at least two core routers ($P_1$, $P_2$) and ($P_3$, $P_4$) among the plurality of core routers ($P_1, P_2, P_3, \ldots P_6$) in the core network. As used herein, the phrase at least means not less than. For traffic from $CE_1$ to $CE_2$, $PE_1$ can be considered to be the ingress PE and $PE_2$ can be considered to be the egress PE. For traffic in the opposite direction from $CE_2$ to $CE_1$, $PE_2$ can be considered to be the ingress PE and $PE_1$ can be considered to be the egress PE. In certain exemplary embodiments, it can be possible to improve scalability of the entire network by removing such PE routers from the IGP process. In this regard, assuming $PE_1$ can be operating as an ingress PE router, after $PE_1$ learns routes with a next hop equal to the IP address of $PE_2$ (the egress PE router in this case) through iBPG, $PE_1$ can apply load balancing over the physical links to $P_1$ and $P_2$ to send incoming traffic either to either of these core router irrespective of the routing protocols utilized between routers $P_1, P_2, P_3, P_4, P_5$ and $P_6$. Thus, the routing information base (RIB) that can hold many routes computed between the core routers might not be included in $PE_1$ and $PE_2$. This RIB for the IGP process can be included in the core routers $P_1$ through $P_6$. This network topology information can be exchanged between the core routers using, for example, the Open Shortest Path First (OSPF) protocol, the Intermediate-System-to-Intermediate-System (IS-IS) protocol, or the like. The OSPF protocol is described in detail in Request for Comments (RFC) 2328, entitled OSPF Version 2, April 1998, and the IS-IS protocol is described in more detail in RFC 1195, entitled Use of OSI IS-IS for Routing in TCP/IP and Dual Environments, December 1990.

In the IGP process, a sending router executing the same can generate and disseminate a Link State Advertisement (LSA) containing routing information that can include a list of the router's neighbors and one or more cost values associated with each neighbor. As used herein, the phrase generate means to create, produce, render, give rise to, and/or bring into existence. As used herein, the phrase associate means to relate, bring together in a relationship, map, combine, join, and/or connect The cost value can be an arbitrary metric that can be employed to determine the relative ease or burden of communicating with the neighbor. This can include, but might not be limited to, the average number of hops required, average travel time for a packet to travel, and/or amount of bandwidth available over a communications link coupling the routers. As used herein, the phrase coupling means (n) a device adapted to join, connect, and/or link; (v) joining, connecting, and/or linking. The LSAs can be "advertised" among the routers so that each router in the network can construct an identical view of the network topology by aggregating the received lists of neighboring routers and associated cost values. As used herein, the phrase can means is capable of, in at least some embodiments. This routing information can be then input into the OSPF or IS-IS calculation to determine the lowest-cost network paths between routers. As used herein, the phrase input means a signal, data, and/or information provided to a processor, device, and/or system As used herein, the phrase signal means information, such as machine instructions for activities and/or one or more letters, words, characters, symbols, signal flags, visual displays, and/or special sounds, etc. having prearranged meaning, encoded as automatically detectable variations in a physical variable, such as a pneumatic, hydraulic, acoustic, fluidic, mechanical, electrical, magnetic, optical, chemical, and/or biological variable, such as power, energy, pressure, flowrate, viscosity, density, torque, impact, force, frequency, phase, voltage, current, resistance, magnetomotive force, magnetic field intensity, magnetic field flux, magnetic flux density, reluctance, permeability, index of refraction, optical wavelength, polarization, reflectance, transmittance, phase shift, concentration, and/or temperature, etc. Depending on the context, a signal and/or the information encoded therein can be synchronous, asynchronous, hard real-time, soft real-time, non-real time, continuously generated, continuously varying, analog, discretely generated, discretely varying, quantized, digital, broadcast, multicast, unicast, transmitted, conveyed, received, continuously measured, discretely measured, processed, encoded, encrypted, multiplexed, modulated, spread, de-spread, demodulated, detected, de-multiplexed, decrypted, and/or decoded, etc.

In accordance with an exemplary embodiment, there might not be a need to maintain a link-state database at the PE routers. Each PE router can be coupled over at least a pair of known physical links to core routers $P_1$, $P_2$ and $P_3$, $P_4$. The core routers $P_1$, $P_2$, $P_3$ and $P_4$ can each maintain a database of the respective PE routers that can be attached to it. The ingress PE router, say $PE_1$ for traffic from $CE_1$, can blindly balance traffic across the physical uplinks to core routers $P_1$, $P_2$. That is, $PE_1$ can stream traffic to the same IP address ($PE_2$) over two identical cost paths to $PE_1$, $PE_2$. For example, $PE_1$ can stream FTP traffic over the physical link to $P_1$, while sending Telenet traffic over the physical link to $P_2$.

In the context of a VPN, $PE_1$ can apply a Virtual Route Forwarding (VRF) label at $PE_1$, without adding a destination label. The destination label can be added at the ingress P router ($P_1$ or $P_2$). The destination label can be thereafter removed at the egress P router ($P_3$ or $P_4$).

Figure 5:
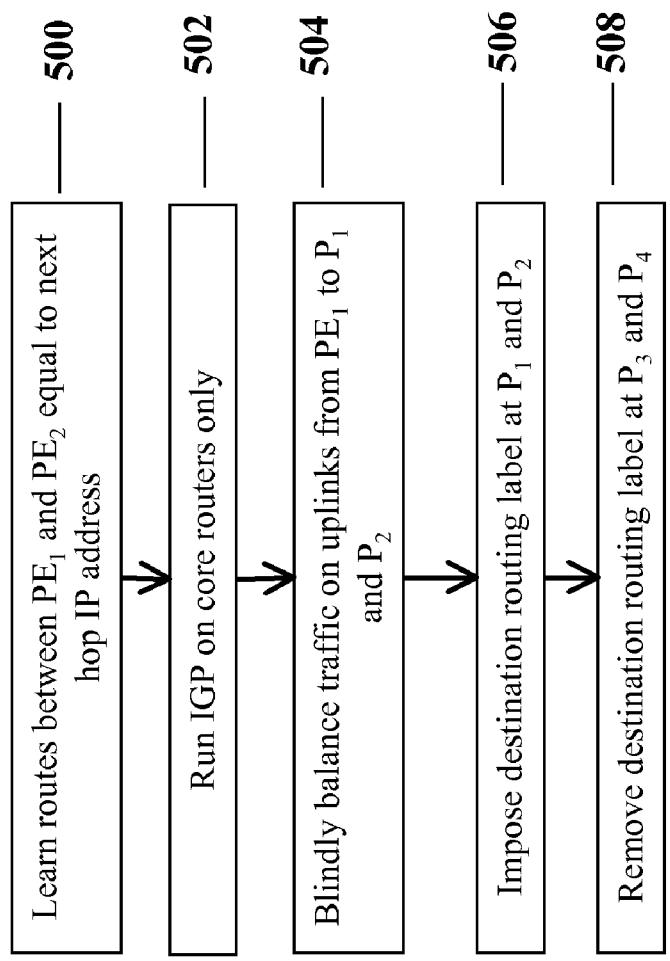
FIG. 5 is a flow chart depicting an exemplary method of an exemplary embodiment.

Referring now to FIG. 5, there is shown a flowchart of an illustrative methodology in accordance with an exemplary embodiment. The method for routing traffic through a network from an ingress PE router ($PE_1$ or $PE_2$) to an egress PE edge router ($PE_1$ or $PE_2$) might eliminate a sharing of state information between the ingress provider edge router ($PE_1$ or $PE_2$) and a plurality of core routers ($P_1$-$P_6$) in a core network, the ingress PE router and egress PE router each can be respectively coupled to at least two core routers ($P_1$, $P_2$, $P_3$ and $P_4$) among the plurality of core routers ($P_1$-$P_6$) in the core network. In step 500, the ingress provider edge router (e.g., $PE_1$) can learn routes with a next hop equal to an IP address of the egress provider edge router ($PE_2$) through an internal border gateway protocol (iBGP). In step 502, the internal gateway protocol (IGP) can be run exclusively on the core routers in the core network to disseminate routing information among the core routers, the IGP not running on the ingress provider edge router. In step 504, the ingress provider edge router $PE_1$ can blindly balance traffic on uplinks between the $PE_1$ and the at least two core routers $P_1$, $P_2$ coupled to $PE_1$ without knowledge of network topology in the core network. If the traffic can be being communicated over a VPN, $PE_1$ applies a VRF label. In step 506, a destination routing label for the traffic can be imposed at the core routers $P_1$, $P_2$ coupled to $PE_1$ after receiving the traffic from $PE_1$. In step 508, the destination routing label can be removed at either $P_3$ or $P_4$. For traffic traveling in the reverse direction from $CE_2$, the process can be simply reversed with $PE_2$ operating as the ingress provider edge router.

In summary, exemplary embodiments can include a method and system to segment the IGP routing information between core routers and provider edge routers in order to allow massive scaling of IGP routing infrastructures. Through static configuration in the P router and new logic in the PE, there might not be a need to include the PEs in the IGP infrastructure. As used herein, the phrase configure means to design, arrange, set up, shape, and/or make suitable and/or fit for a specific purpose.

Figure 6:
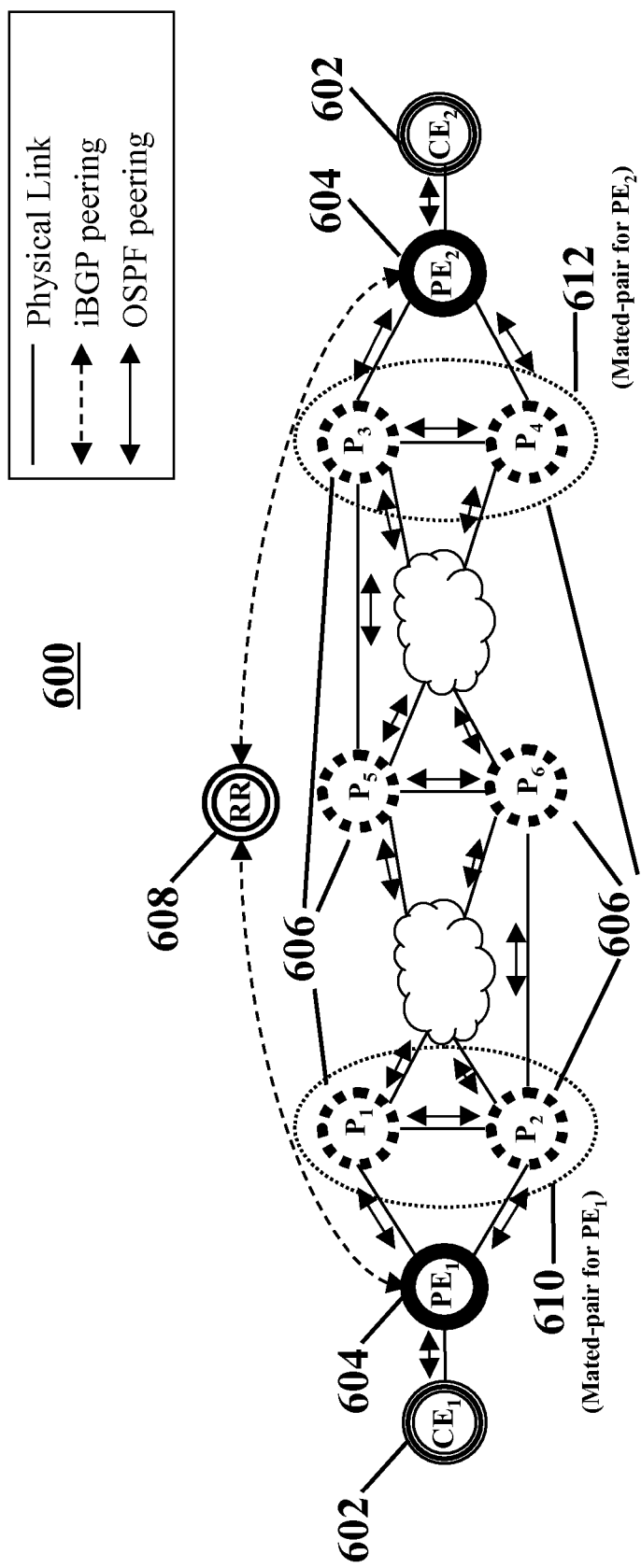
FIG. 6 is a schematic of an illustrative network of an exemplary embodiment.

Referring now to FIG. 6, there is depicted an illustrative schematic diagram of a network 600 comprising a pair of Customer Edge (CE) routers 602 ($CE_1$, $CE_2$) coupled to a pair of Provider Edge (PE) routers 604 ($PE_1$, $PE_2$) at edges of a Multi-Protocol Label Switching (MPLS) autonomous system including a plurality of core routers (P) 606 ($P_1$, $P_2$, $P_3$, ... $P_6$). In the example shown, a VPN is depicted, which can employ a VPNv4 route reflector (RR) 608 for exchanging route information between an ingress PE router and an egress PE router relative to the core via the internal Border Gateway Protocol (iBGP). The PE routers in this can cooperate to establish a logical peer connection (session). iBGP can be an intra-domain routing protocol that typically operates over a reliable transport protocol such as TCP to establish a TCP connection between routing peers within the autonomous system. Each route between the PE routers 604 ($PE_1$, $PE_2$) that can be advertised by the iBGP can have a next hop address that can be reachable through an Internal Gateway Protocol (IGP) in order for such route to be considered valid. As discussed above, the IGP can be a link state or distance-vector protocol. In accordance with an exemplary embodiment, the PE routers 604 ($PE_1$, $PE_2$) might not share state information with the core routers 606 ($P_1$, $P_2$, $P_3$, ... $P_6$), and can be thus removed from the IGP process.

As shown in FIG. 6, router $PE_1$ 604 can be coupled to a "mated pair" of core routers ($P_1$, $P_2$) 610, while router $PE_2$ 604 can be coupled to a mated pair of core routers ($P_3$, $P_4$) 612. For traffic from $CE_1$ to $CE_2$, $PE_1$ can be considered to be the ingress PE and $PE_2$ can be considered to be the egress PE. For traffic in the opposite direction from $CE_2$ to $CE_1$, $PE_2$ can be considered to be the ingress PE and $PE_1$ can be considered to be the egress PE. Certain exemplary embodiments can improve scalability of the entire network by removing these PE routers from the IGP process. In this regard, assuming $PE_1$ can be operating as an ingress PE router, after $PE_1$ learns routes with a next hop equal to the IP address of $PE_2$ (the egress PE router in this case) through iBPG, $PE_1$ can apply load balancing over the physical links to $P_1$ and $P_2$ to send incoming traffic either to either of these core router irrespective of the routing protocols utilized between routers $P_1$, $P_2$, $P_3$, $P_4$, $P_5$ and $P_6$. Thus, the routing information base (RIB) that can hold many routes computed between the core routers need not be included in $PE_1$ and $PE_2$. This RIB for the IGP process can be included in the core routers $P_1$ through $P_6$. This network topology information can be exchanged between the core routers using, for example, the Open Shortest Path First (OSPF) protocol, the Intermediate-System-to-Intermediate-System (IS-IS) protocol, or the like. The OSPF protocol is described in detail in Request for Comments (RFC) 2328, entitled OSPF Version 2, April 1998, and the IS-IS protocol is described in more detail in RFC 1195, entitled Use of OSI IS-IS for Routing in TCP/IP and Dual Environments, December 1990.

In the IGP process, a sending router executing the same can generate and disseminate a Link State Advertisement (LSA) containing routing information that includes a list of all of the router's neighbors and one or more cost values associated with each neighbor. The cost value can be an arbitrary metric that can be employed to determine the relative ease or burden of communicating with the neighbor. This can include, but is not limited to, the average number of hops required, average travel time for a packet to travel, and/or amount of bandwidth available over a communications link coupling the routers. The LSAs can be "advertised" among the routers so that each router in the network can construct an identical view of the network topology by aggregating the received lists of neighboring routers and associated cost values. This routing information can be then input into the OSPF or IS-IS calculation to determine the lowest-cost network paths between routers.

There might not be a need to maintain a link-state database in the PE routers since these routers can be removed from the IGP. As discussed above, each PE router can be coupled to its respective mated pair of core routers ($P_1$, $P_2$) and ($P_3$, $P_4$). Each core router $P_1$, $P_2$, $P_3$ and $P_4$ can maintain a database identifying the respective PE router that can be attached to it. The ingress PE router, say $PE_1$ for traffic from $CE_1$, can balance traffic flows across the physical uplinks to core routers $P_1$, $P_2$. That is, $PE_1$ can streams traffic to the same IP address ($PE_2$) over two identical cost paths to $P_1$, $P_2$. For example, $PE_1$ can stream one traffic flow over the physical link to $P_1$, while sending another traffic flow over the physical link to $P_2$.

In the context of a VPN, $PE_1$ can apply a Virtual Route Forwarding (VRF) label at $PE_1$, without adding a destination label. The destination label can be added at the ingress P router ($P_1$ or $P_2$). The destination label can be thereafter removed at the egress P router ($P_3$ or $P_4$).

Figure 7:
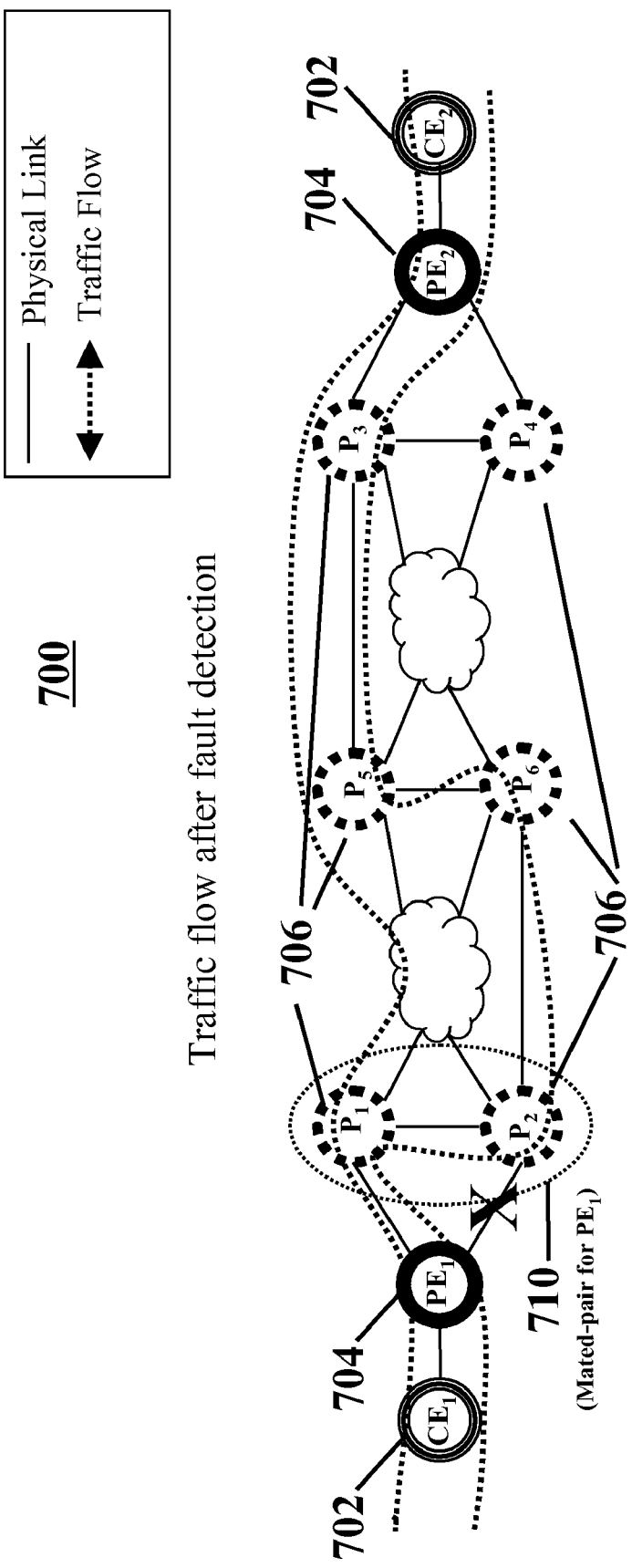
FIG. 7 is a schematic of an illustrative network of an exemplary embodiment showing traffic flow after fault detection.

Referring again to FIG. 6, an exemplary embodiment with respect to link failures between the PE routers and the mated pair of core routers coupled to each PE router can now be described. Since the mated pair—PE links can be substantially identical, the following description refers to link failures between mated pair 610 ($P_1$, $P_2$) and $PE_1$ 604. The mated pair arrangement can eliminate a need for pre-defined backup tunnels and IGP network reconvergence between $PE_1$ and $P_1$, $P_2$ in the event of a link failure between $PE_1$ and either $P_1$ or $P_2$. Since each PE router can have a known mated pair of P routers associated with it, any link failure that occurs between one of the mated pair P routers and the PE router can be addressed by the P router that experiences the link failure by simply directing traffic destined for the PE router to the other P router of the mated pair. Thus, with reference now to FIG. 7, if, for example, the link between $PE_1$ 704 and $P_2$ 706 fails, $P_2$ 706 directs any upstream traffic destined for $PE_1$ 704 to $P_1$ 706 since $P_2$ 706 "knows" that $P_1$ 706 can be part of the mated pair 710 for $PE_1$. $P_1$ can then direct the traffic to $PE_1$. Accordingly, network-wide IGP reconvergence event for the $PE_1$-$P_2$ link failure might not occur, thereby reducing the potential for packet loss. This can result in an asymmetrical traffic flow, such as shown in FIG. 7 with ingress traffic being routed from $PE_1$ to $PE_2$ via path $P_1$-$P_5$-$P_3$, while upstream traffic to $PE_1$ can be routed via $P_3$-$P_5$-$P_6$-$P_2$-$P_1$.

Figure 8:
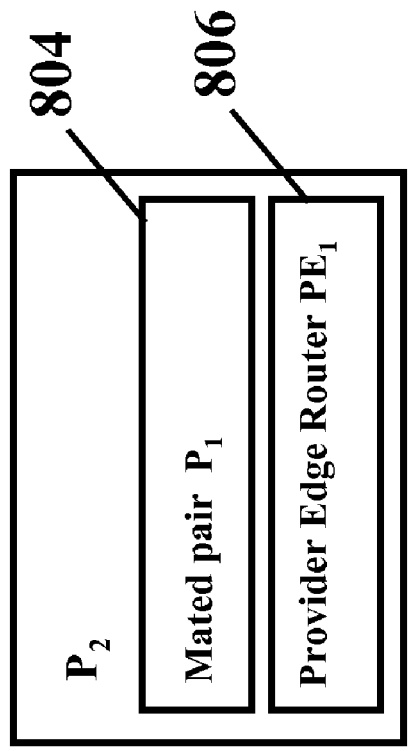
FIG. 8 is a sample data structure for each of a mated pair of core routers in accordance with an exemplary embodiment.
Figure 8:
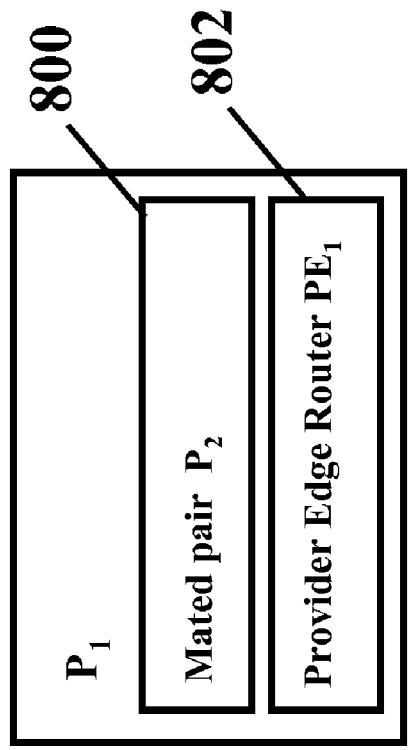

With reference now to FIG. 8, each P node in the "mated pair" ($P_1$, $P_2$) can maintain a database of information for any directly connected PE routers (i.e., $PE_1$), as well as the other P router of the "mated pair". This can be implemented via provisioning or can be made discoverable through a protocol. A sample data structure is depicted in FIG. 8, where $P_1$ can identify the other router in the mated pair, $P_2$ (box 800) and provider edge router $PE_1$ (box 802). As used herein, the phrase data structure means an organization of a collection of data that allows the data to be manipulated effectively and/or a logical relationship among data elements that can be designed to support specific data manipulation functions. A data structure can comprise meta data to describe the properties of the data structure. Examples of data structures can include: array, dictionary, graph, hash, heap, linked list, matrix, object, queue, ring, stack, tree, and/or vector. Similarly, $P_2$ can identify the other router in the mated pair, $P_1$ (box 804) and provider edge router $PE_1$ (box 806).

Figure 9:
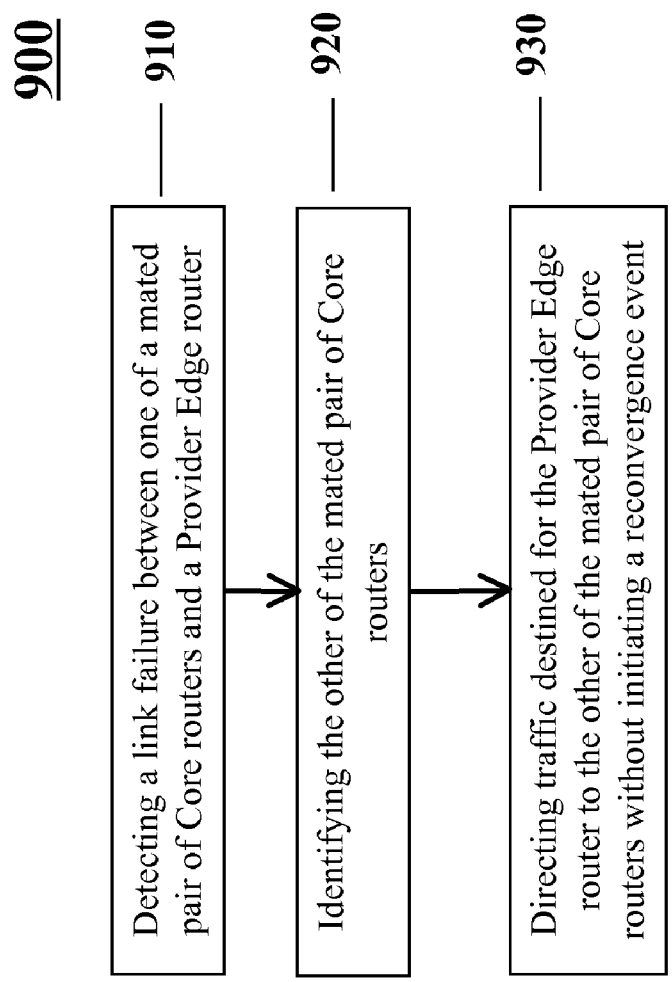
FIG. 9 is a flow chart depicting an exemplary method in accordance with of an exemplary embodiment.

Referring now to FIG. 9, there is shown a flowchart of an illustrative methodology in accordance with an exemplary embodiment. The method can enable the rerouting of upstream traffic destined for the provider edge router in the event of a link failure between one of the core routers in the mated pair and the provider edge router. In step 910, one of the core routers in the mated pair can detect a link failure between that core router and the provider edge router. In step 920, the router can identify the other router in the mated pair. In step 930, traffic destined for the provider edge router can be rerouted to the other of the core routers in the mated pair without initiating a reconvergence event.

Figure 10:
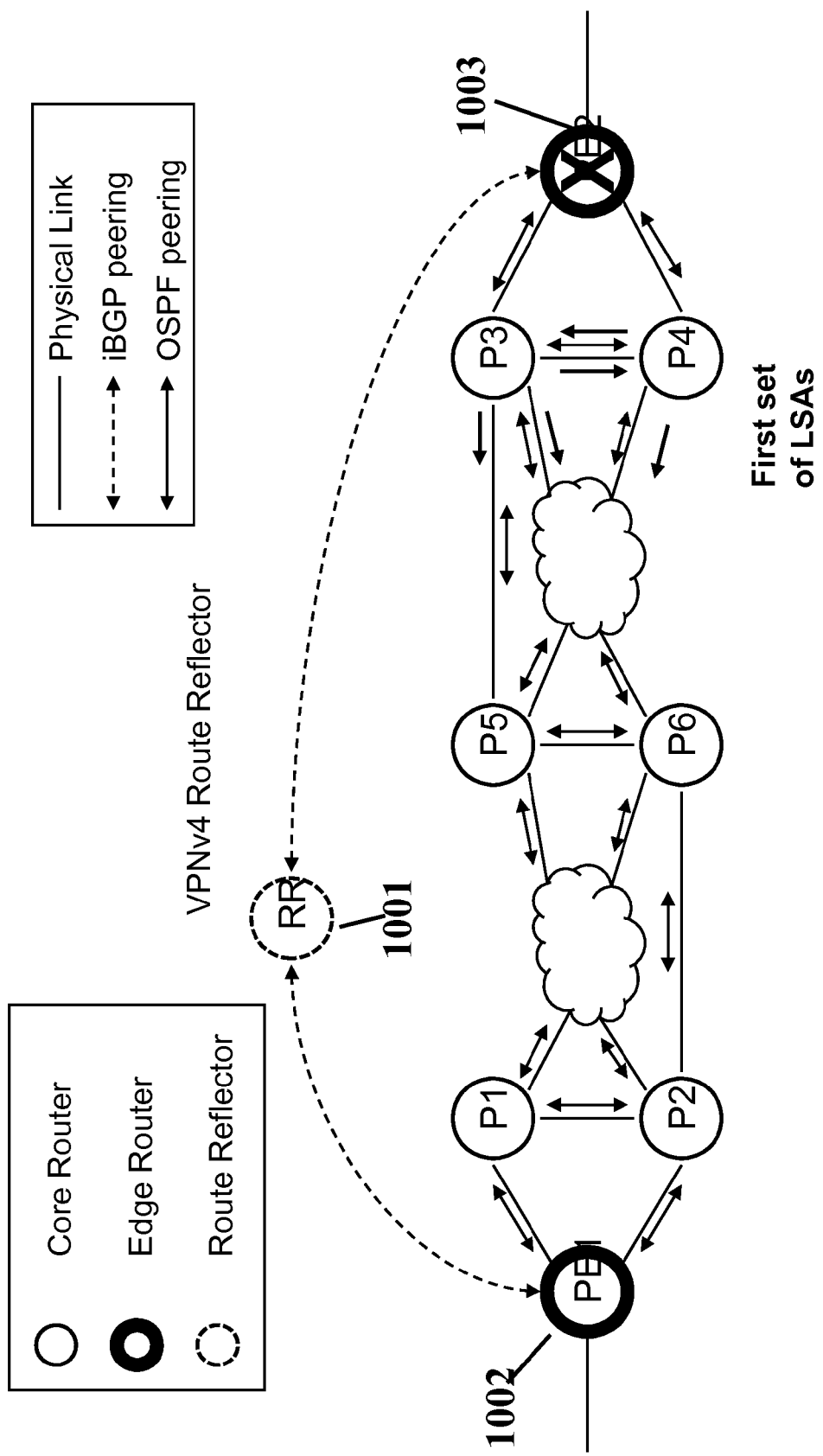
FIG. 10 is a schematic diagram of an exemplary embodiment of a system 10000.

FIG. 10 is a schematic diagram of an exemplary embodiment of a system 10000, which can comprise a plurality of routers and a router reflector 1001. The plurality of routers can comprise an ingress PE router 1002. Ingress PE router 1002 can learn customer routes with a next hop equal to an Internet Protocol (IP) address of an egress PE router 1003 through iBGP (either using VPNv4 or IPv4 Route Reflector Infrastructure). Routing to that egress PE IP address can be learned through OSPF. VRF and Destination Labels both can be imposed by ingress PE router 1002. A destination label can be removed by a final P Router. Egress PE router 1003 can receive a VRF label. A failure of egress PE router 1003 can be detected by P3 and P4. LSAs can be generated and/or propagated back through network, node by node, to ingress PE router 1002 as well as other PEs of system 10000.

Figure 11:
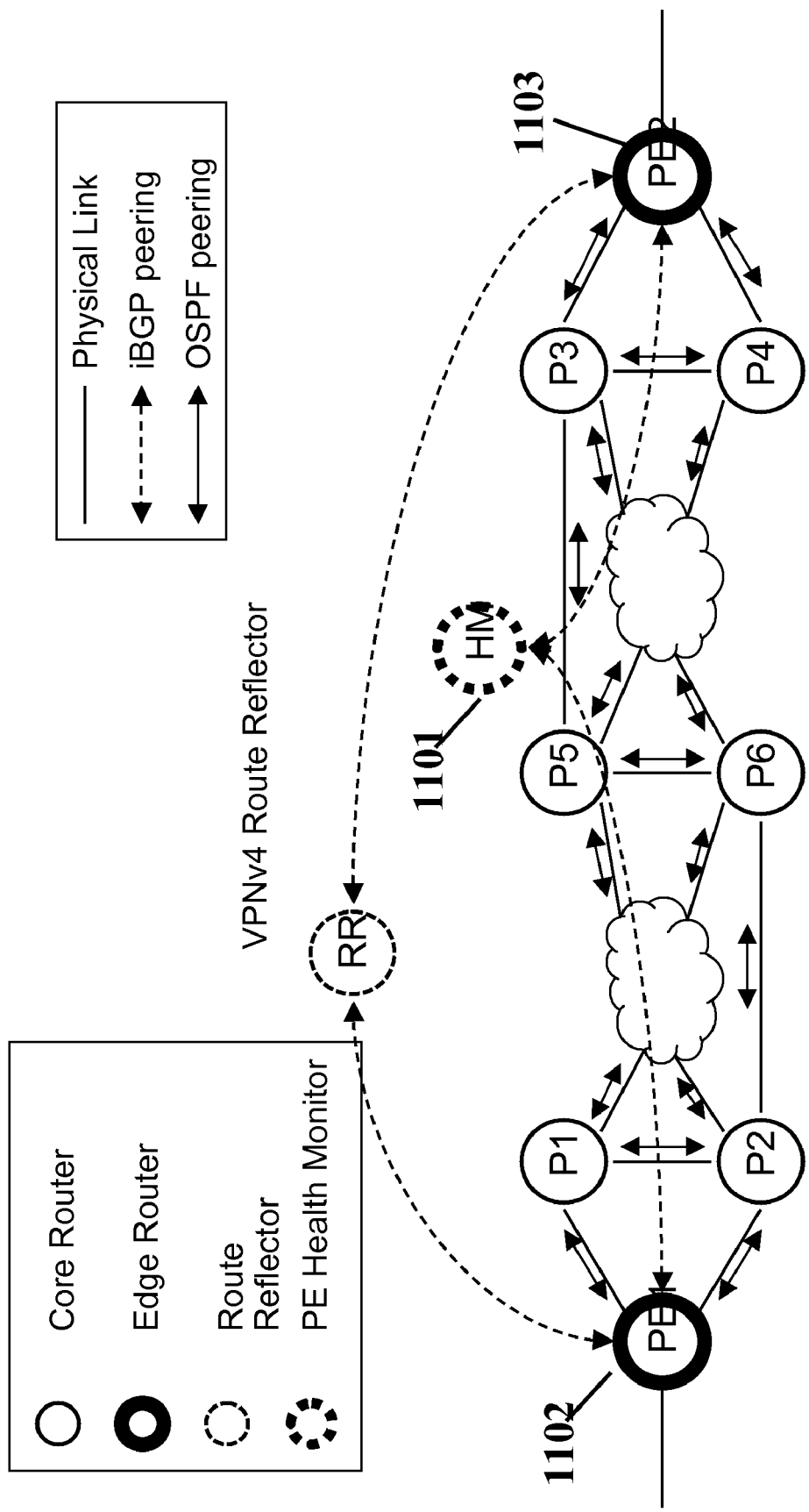
FIG. 11 is a schematic diagram of an exemplary embodiment of a system 11000.

FIG. 11 is a schematic diagram of an exemplary embodiment of a system 11000. In certain exemplary embodiments, an ingress PE 1102 can learn customer routes with Next Hop equal to the IP address of egress PE 1103 through iBGP (either using VPNv4 or IPv4 Route Reflector Infrastructure). Routing to the IP address of egress PE 1103 can be learned through OSPF. Virtual Routing and Forwarding (VRF) and/or Destination Labels can be imposed by ingress PE 1102. The destination Label can be removed by a final P Router. In certain exemplary embodiments, egress PE 1103 might receive only a VRF label.

Figure 12:
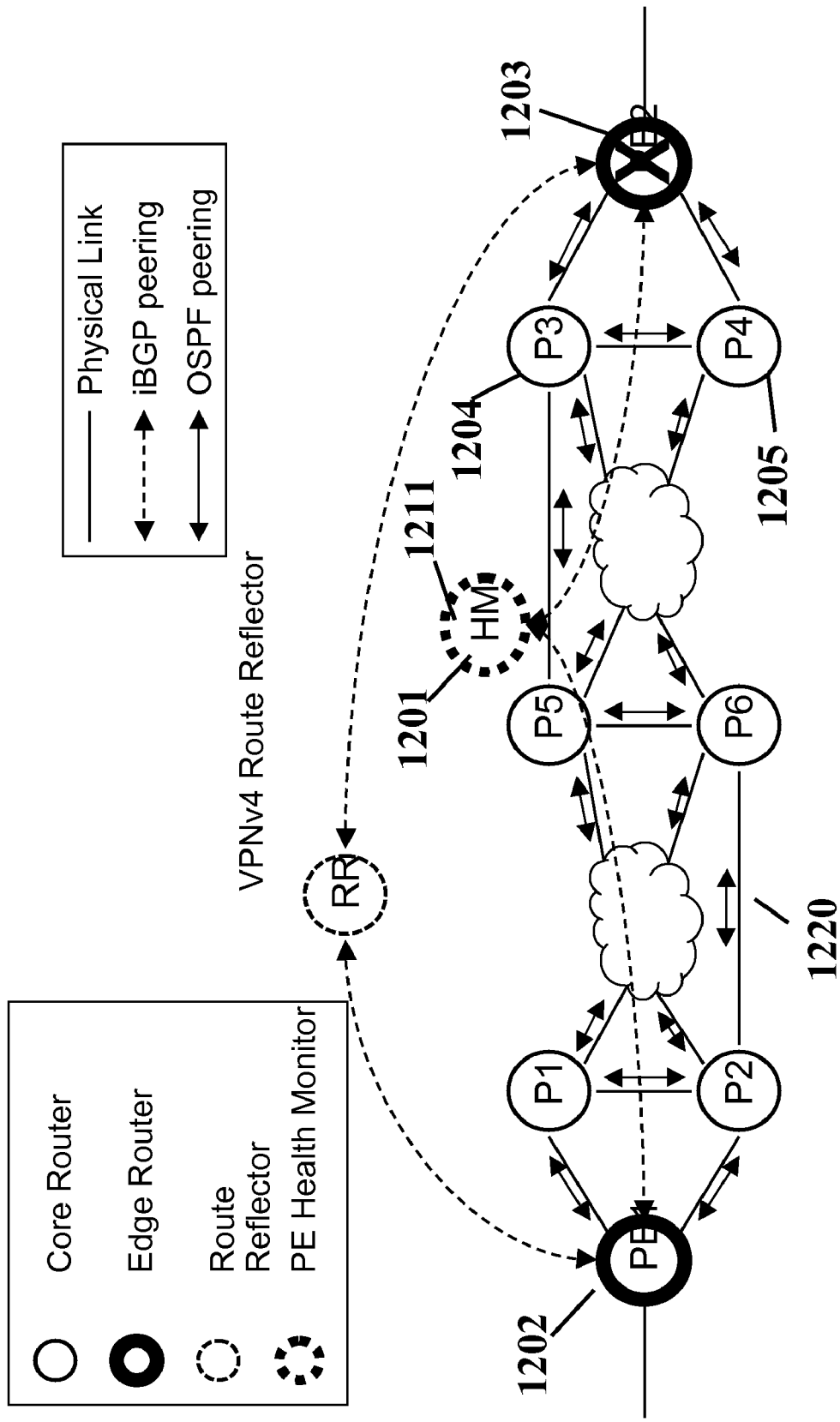
FIG. 12 is a schematic diagram of an exemplary embodiment of a system 12000.

FIG. 12 is a schematic diagram of an exemplary embodiment of a system 12000. In certain exemplary embodiments, a failure of egress PE 1203 can be detected by router 1204 and/or router 1205. Link State Advertisements (LSAs) can be generated and/or propagated back through network, node by node, to ingress PE 1202 (as well as other PEs). In certain exemplary embodiments, a failure of egress PE 1203 can be detected by PE Health Monitor 1201. Health Monitor 1201 can directly inform ingress PE 1202 as well as other PEs.

Certain exemplary embodiments can provide a method to centrally monitor the health of Provider Edge routers (PEs) in a network and to signal those failures (of a PE) to other PEs in the network very quickly and very reliably. The method can define an independent functionality that serves to help segment the control plane functionality of a router network from the data plane.

In certain exemplary embodiments, the failure of egress PE 1203 can be signaled to other PEs in the network through the reconvergence of an Internet Gateway Protocol (IGP). Such signals can take anywhere from seconds to 10s of seconds to cascade through the network. Certain exemplary embodiments can improve rates of detection and signaling to sub-second levels.

Certain exemplary embodiments can utilize a central routing device/computer such as PE Health Monitor 1201 to run a lightweight polling protocol to PEs in the network. As used herein, the phrase poll means to check status to see if a particular external event has occurred. One example of such a protocol is Bidirectional Forwarding Detection (BFD). As used herein, the phrase Bidirectional Forwarding Detection (BFD) Protocol means a network protocol, defined by the Internet Engineering Task Force (IETF), that is used to detect faults between two forwarding engines. When a hard failure is detected then this same router/computer can inform other PEs in the network immediately. Multiple routers/computers can be used and the PE endpoints can see failure indications from a majority of them (using a voting technique) before the PEs declare the PE endpoint failed and unreachable. As used herein, the phrase majority means more than half. Certain exemplary embodiments can segment the control plane functionality of a router network from the data plane. This separation is key can be useful to provide reliable transport of data across very large networks.

PE Health Monitor 1201 can comprise a processor that is adapted to automatically cause a transmission of a report to each of a plurality of Provider Edge routers, such as PE router 1202. As used herein, the phrase cause means to bring about, provoke, precipitate, produce, elicit, be the reason for, result in, and/or effect. As used herein, the phrase automatically means acting and/or operating in a manner essentially independent of external human influence and/or control. For example, an automatic light switch can turn on upon "seeing" a person in its view, without the person manually operating the light switch. As used herein, the phrase adapted to means suitable, fit, and/or capable of performing a specified function. The report can be indicative of a suspected failure of a Provider Edge router, such as egress PE 1203, of the plurality of Provider Edge routers. As used herein, the phrase indicative means serving to indicate. As used herein, the phrase suspect means to form an opinion and/or inference based upon investigation, reasoning, and/or calculation.

As used herein, the phrase processor means a hardware, firmware, and/or software machine and/or virtual machine physically adaptable to perform, via boolean logic operating on a plurality of logic gates, a specific task defined by a set of machine-implementable instructions. A processor can utilize mechanical, pneumatic, hydraulic, electrical, magnetic, optical, informational, chemical, and/or biological principles, mechanisms, adaptations, signals, inputs, and/or outputs to perform the task(s). In certain embodiments, a processor can act upon information by manipulating, analyzing, modifying, and/or converting it, transmitting the information for use by machine-implementable instructions and/or an information device, and/or routing the information to an output device. A processor can function as a central processing unit, local controller, remote controller, parallel controller, and/or distributed controller, etc. Unless stated otherwise, the processor can be a general-purpose device, such as a microcontroller and/or a microprocessor, such the Pentium family of microprocessor manufactured by the Intel Corporation of Santa Clara, Calif. In certain embodiments, the processor can be dedicated purpose device, such as an Application Specific Integrated Circuit (ASIC) or a Field Programmable Gate Array (FPGA) that has been designed to implement in its hardware and/or firmware at least a part of an embodiment disclosed herein. A processor can reside on and use the capabilities of a controller.

PE Health Monitor 1201 can be adapted to automatically poll each of the plurality of Provider Edge routers with Bidirectional Forwarding Detection protocol messages. Each of the plurality of Provider Edge routers might not be adapted to communicate via Interior Gateway Protocol messages. A network 1220 can comprise PE Health Monitor 1201 and the plurality of Provider Edge routers. Each of the plurality of Provider Edge routers can be adapted to automatically change a route of at least one forwarded packet responsive to the suspected failure. As used herein, the phrase change means (v.) to cause to be different; (n.) the act, process, and/or result of altering or modifying. As used herein, the phrase responsive means reacting to an influence and/or impetus.

Figure 13:
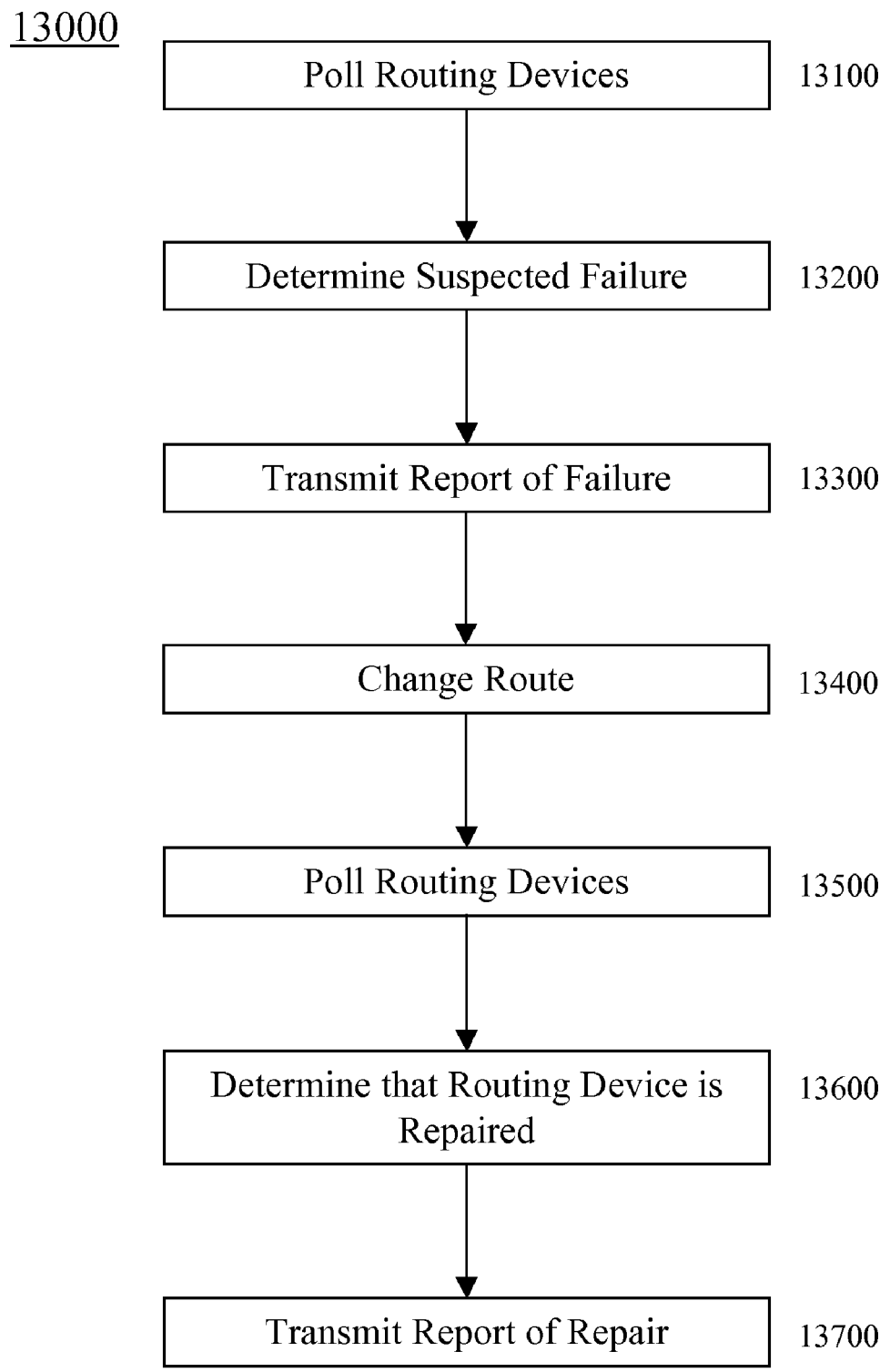
FIG. 13 is a flowchart of an exemplary embodiment of a method 13000.

FIG. 13 is a flowchart of an exemplary embodiment of a method 13000. Any set and/or subset of activities of method 13000 can be implemented automatically. As used herein, the phrase activity means an action, act, deed, function, step, and/or process and/or a portion thereof. Any set or subset of activities of method 13000 can be carried out via machine-implementable instructions stored on a machine-readable medium. As used herein, the phrase method means one or more acts that are performed upon subject matter to be transformed to a different state or thing and/or are tied to a particular apparatus, said one or more acts not a fundamental principal and not pre-empting all uses of a fundamental principal. As used herein, the phrase store means to place, hold, retain, enter, and/or copy into and/or onto a machine-readable medium.

At activity 13100, routing devices can be polled. In certain exemplary embodiments, from a central routing device of a plurality of central routing devices, each of a plurality of Provider Edge routers can be automatically polled with Bidirectional Forwarding Detection protocol messages. Each of the plurality of Provider Edge routers might not be adapted to communicate via Interior Gateway Protocol at the central routing device. As used herein, the phrase central routing device means a non-edge device that is logically located in a network of a provider of telecommunications services; the device adapted to determine and/or communicate routing information to other devices, such as edge routers, in the network of the provider. Each of the plurality of Provider Edge routers can be adapted to automatically determine that the Provider Edge router has failed responsive to a receipt of signals from a majority of the plurality of central routing devices of the suspected failure of the Provider Edge router.

At activity 13200, a suspected failure can be determined. In certain exemplary embodiments, a suspected failure of a Provider Edge router of the plurality of Provider Edge routers can be automatically determined.

At activity 13300, a report of the suspected failure can be transmitted. As used herein, the phrase report means a presentation of information in a predetermined format. In certain exemplary embodiments, from the central routing device a report can be automatically transmitted to each of the plurality of Provider Edge routers. The report can be indicative of the suspected failure of the Provider Edge router. Each of the plurality of routers can be adapted to change a route of at least one forwarded packet responsive to the report.

At activity 13400, a route can be changed. For example, at a first Provider Edge router of a plurality of Provider Edge routers, a route of at least one forwarded packet can be automatically changed responsive to a received report of a suspected failure of a second Provider Edge router of the plurality of Provider Edge routers. As used herein, the phrase first means an initial element of a set. The first Provider Edge router and the second Provider Edge router might not be adapted to communicate via Interior Gateway Protocol messages. A central routing device adapted to transmit the report to the first Provider Edge router. The central routing device can be adapted to poll each of the plurality of Provider Edge routers with Bidirectional Forwarding Detection protocol messages.

At activity 13500, the routing devices can be polled. For example, the Provider Edge router can be automatically polled to identify a repair of the suspected failure.

At activity 13600, a determination can be made that the failed routing device has been repaired. The determination can be made responsive to a receipt of an acknowledgement from the Provider Edge router. As used herein, the phrase acknowledgement means a response to a communication.

At activity 13700, a report of the repair to the failed routing device can be transmitted. In certain exemplary embodiments, a report can be automatically transmitted to each of the plurality of Provider Edge routers that the previously failed Provider Edge router is operational. As used herein, the phrase operational means in service.

Figure 14:
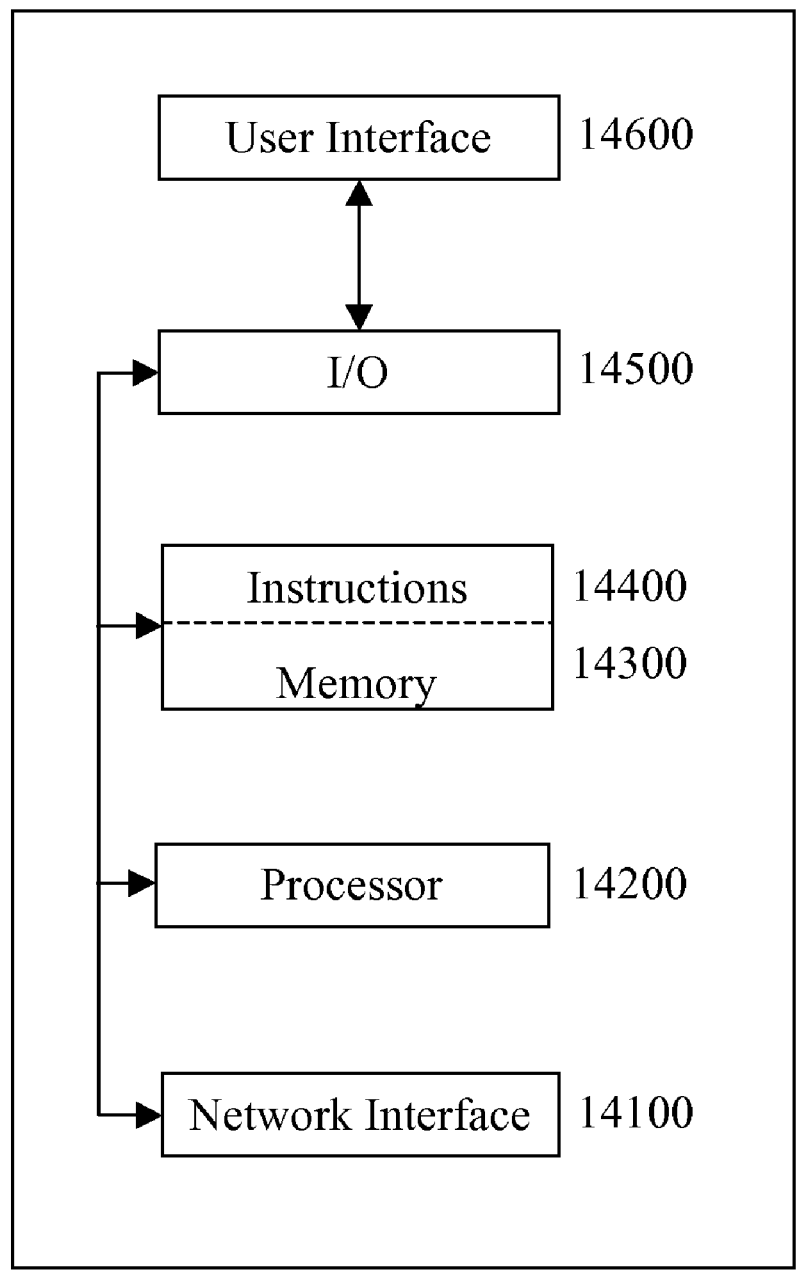
FIG. 14 is a block diagram of an exemplary embodiment of an information device 14000.

FIG. 14 is a block diagram of an exemplary embodiment of an information device 14000, which in certain operative embodiments can comprise, for example, Provider Edge Health Monitor 1201 of FIG. 12. Information device 14000 can comprise any of numerous circuits and/or components, such as for example, one or more network interfaces 14100, one or more processors 14200, one or more memories 14300 containing instructions 14400, one or more input/output (I/O) devices 14500, and/or one or more user interfaces 14600 coupled to I/O device 14500, etc. As used herein, the phrase circuit means a physical system comprising: an electrically conductive pathway and/or a communications connection established across a switching device (such as logic gates); and/or an electrically conductive pathway and/or a communications connection established across two or more switching devices comprised by a network and between corresponding end systems connected to, but not comprised by the network. As used herein, the phrase memory device means an apparatus capable of storing, sometimes permanently, machine-implementable instructions, data, and/or information, in analog and/or digital format. Examples include at least one non-volatile memory, volatile memory, register, relay, switch, Random Access Memory, RAM, Read Only Memory, ROM, flash memory, magnetic media, hard disk, floppy disk, magnetic tape, optical media, optical disk, compact disk, CD, digital versatile disk, DVD, and/or raid array, etc. The memory device can be coupled to a processor and/or can store and provide instructions adapted to be executed by processor, such as according to an embodiment disclosed herein.

In certain exemplary embodiments, via one or more user interfaces 14600, such as a graphical user interface, a user can view a rendering of information related to researching, designing, modeling, creating, developing, building, manufacturing, operating, maintaining, storing, marketing, selling, delivering, selecting, specifying, requesting, ordering, receiving, returning, rating, and/or recommending any of the products, services, methods, and/or information described herein. As used herein, the phrase create means to make, form, produce, generate, bring into being, and/or cause to exist. As used herein, the phrase recommend means to suggest, praise, commend, and/or endorse. As used herein, the phrase request means (v.) to express a need and/or desire for; to inquire and/or ask for. (n.) that which communicates an expression of desire and/or that which is asked for. As used herein, the phrase select means to make and/or indicate a choice and/or selection from among alternatives.

As used herein, the phrase user means a person, organization, process, device, program, protocol, and/or system that uses a device, system, process, and/or service. As used herein, the phrase user interface means a device and/or software program for rendering information to a user and/or requesting information from the user. A user interface can include at least one of textual, graphical, audio, video, animation, and/or haptic elements. A textual element can be provided, for example, by a printer, monitor, display, projector, etc. A graphical element can be provided, for example, via a monitor, display, projector, and/or visual indication device, such as a light, flag, beacon, etc. An audio element can be provided, for example, via a speaker, microphone, and/or other sound generating and/or receiving device. A video element or animation element can be provided, for example, via a monitor, display, projector, and/or other visual device. A haptic element can be provided, for example, via a very low frequency speaker, vibrator, tactile stimulator, tactile pad, simulator, keyboard, keypad, mouse, trackball, joystick, gamepad, wheel, touchpad, touch panel, pointing device, and/or other haptic device, etc. A user interface can include one or more textual elements such as, for example, one or more letters, number, symbols, etc. A user interface can include one or more graphical elements such as, for example, an image, photograph, drawing, icon, window, title bar, panel, sheet, tab, drawer, matrix, table, form, calendar, outline view, frame, dialog box, static text, text box, list, pick list, pop-up list, pull-down list, menu, tool bar, dock, check box, radio button, hyperlink, browser, button, control, palette, preview panel, color wheel, dial, slider, scroll bar, cursor, status bar, stepper, and/or progress indicator, etc. A textual and/or graphical element can be used for selecting, programming, adjusting, changing, specifying, etc. an appearance, background color, background style, border style, border thickness, foreground color, font, font style, font size, alignment, line spacing, indent, maximum data length, validation, query, cursor type, pointer type, autosizing, position, and/or dimension, etc. A user interface can include one or more audio elements such as, for example, a volume control, pitch control, speed control, voice selector, and/or one or more elements for controlling audio play, speed, pause, fast forward, reverse, etc. A user interface can include one or more video elements such as, for example, elements controlling video play, speed, pause, fast forward, reverse, zoom-in, zoom-out, rotate, and/or tilt, etc. A user interface can include one or more animation elements such as, for example, elements controlling animation play, pause, fast forward, reverse, zoom-in, zoom-out, rotate, tilt, color, intensity, speed, frequency, appearance, etc. A user interface can include one or more haptic elements such as, for example, elements utilizing tactile stimulus, force, pressure, vibration, motion, displacement, temperature, etc.

As used herein, the phrase further means in addition. As used herein, the phrase gateway means a device connected to a network for performing code and/or protocol conversion processes. An entrance and exit into a network. As used herein, the phrase haptic means both the human sense of kinesthetic movement and the human sense of touch. Among the many potential haptic experiences are numerous sensations, body-positional differences in sensations, and time-based changes in sensations that are perceived at least partially in non-visual, non-audible, and non-olfactory manners, including the experiences of tactile touch (being touched), active touch, grasping, pressure, friction, traction, slip, stretch, force, torque, impact, puncture, vibration, motion, acceleration, jerk, pulse, orientation, limb position, gravity, texture, gap, recess, viscosity, pain, itch, moisture, temperature, thermal conductivity, and thermal capacity.

As used herein, the phrase machine means a device and/or vehicle adapted to perform at least one task. As used herein, the phrase machine-implementable instructions means directions adapted to cause a machine, such as an information device, to perform one or more particular activities, operations, and/or functions. The directions, which can sometimes form an entity called a "processor", "kernel", "operating system", "program", "application", "utility", "subroutine", "script", "macro", "file", "project", "module", "library", "class", and/or "object", etc., can be embodied as machine code, source code, object code, compiled code, assembled code, interpretable code, and/or executable code, etc., in hardware, firmware, and/or software. As used herein, the phrase machine readable medium means a physical structure from which a machine, such as an information device, computer, microprocessor, and/or controller, etc., can store and/or obtain machine-implementable instructions, data, and/or information. Examples include a memory device, punch cards, etc. As used herein, the phrase machine-readable means capable of being discerned by an information device. As used herein, the phrase may means is allowed and/or permitted to, in at least some embodiments.

As used herein, the phrase output means (n) something produced and/or generated; data produced by an information device executing machine-readable instructions; and/or the energy, power, work, signal, and/or information produced by a system. (v) to provide, produce, manufacture, and/or generate. As used herein, the phrase said means when used in a system or device claim, an article indicating a subsequent claim term that has been previously introduced. As used herein, the phrase substantially means to a considerable, large, and/or great, but not necessarily whole and/or entire, extent and/or degree. As used herein, the phrase perceptible means capable of being perceived by the human senses. As used herein, the phrase physical means tangible, real, and/or actual. As used herein, the phrase physically means existing, happening, occurring, acting, and/or operating in a manner that is tangible, real, and/or actual. As used herein, the phrase transform means to change in measurable: form, appearance, nature, and/or character. As used herein, the phrase Boolean logic means a complete system for logical operations. As used herein, the phrase digital means non-analog and/or discrete. As used herein, the phrase human-machine interface means hardware and/or software adapted to render information to a user and/or receive information from the user; and/or a user interface.

As used herein, the phrase logic gate means a physical device adapted to perform a logical operation on one or more logic inputs and to produce a single logic output, which is manifested physically. Because the output is also a logic-level value, an output of one logic gate can connect to the input of one or more other logic gates, and via such combinations, complex operations can be performed. The logic normally performed is Boolean logic and is most commonly found in digital circuits. The most common implementations of logic gates are based on electronics using resistors, transistors, and/or diodes, and such implementations often appear in large arrays in the form of integrated circuits (a.k.a., IC's, microcircuits, microchips, silicon chips, and/or chips). It is possible, however, to create logic gates that operate based on vacuum tubes, electromagnetics (e.g., relays), mechanics (e.g., gears), fluidics, optics, chemical reactions, and/or DNA, including on a molecular scale. Each electronically-implemented logic gate typically has two inputs and one output, each having a logic level or state typically physically represented by a voltage. At any given moment, every terminal is in one of the two binary logic states ("false" (a.k.a., "low" or "0") or "true" (a.k.a., "high" or "1"), represented by different voltage levels, yet the logic state of a terminal can, and generally does, change often, as the circuit processes data. Thus, each electronic logic gate typically requires power so that it can source and/or sink currents to achieve the correct output voltage. Typically, machine instructions are ultimately encoded into binary values of "0"s and/or "1"s and, are typically written into and/or onto a memory device, such as a "register", which records the binary value as a change in a physical property of the memory device, such as a change in voltage, current, charge, phase, pressure, weight, height, tension, level, gap, position, velocity, momentum, force, temperature, polarity, magnetic field, magnetic force, magnetic orientation, reflectivity, molecular linkage, molecular weight, etc. An exemplary register might store a value of "01101100", which encodes a total of 8 "bits" (one byte), where each value of either "0" or "1" is called a "bit" (and 8 bits are collectively called a "byte"). Note that because a binary bit can only have one of two different values (either "0" or "1"), any physical medium capable of switching between two saturated states can be used to represent a bit. Therefore, any physical system capable of representing binary bits is able to represent numerical quantities, and potentially can manipulate those numbers via particular encoded machine instructions. This is one of the basic concepts underlying digital computing. At the register and/or gate level, a computer does not treat these "0"s and "1"s as numbers per se, but typically as voltage levels (in the case of an electronically-implemented computer), for example, a high voltage of approximately +3 volts might represent a "1" or "logical true" and a low voltage of approximately 0 volts might represent a "0" or "logical false" (or vice versa, depending on how the circuitry is designed). These high and low voltages (or other physical properties, depending on the nature of the implementation) are typically fed into a series of logic gates, which in turn, through the correct logic design, produce the physical and logical results specified by the particular encoded machine instructions. For example, if the encoding request a calculation, the logic gates might add the first two bits of the encoding together, produce a result "1" ("0"+"1"="1"), and then write this result into another register for subsequent retrieval and reading. Or, if the encoding is a request for some kind of service, the logic gates might in turn access or write into some other registers which would in turn trigger other logic gates to initiate the requested service.

As used herein, the phrase logical means a conceptual representation. As used herein, the phrase special purpose computer means a computer comprising a processor having a plurality of logic gates, whereby at least a portion of those logic gates, via execution of specific machine instructions by the processor, experience a change in at least one physical and measurable property, such as a voltage, current, charge, phase, pressure, weight, height, tension, level, gap, position, velocity, momentum, force, temperature, polarity, magnetic field, magnetic force, magnetic orientation, reflectivity, molecular linkage, molecular weight, etc., thereby directly tying the specific machine instructions to the logic gate's specific configuration and property(ies). In the context of an electronic computer, each such change in the logic gates creates a specific electrical circuit, thereby directly tying the specific machine instructions to that specific electrical circuit. As used herein, the phrase special purpose processor means a processor, having a plurality of logic gates, whereby at least a portion of those logic gates, via execution of specific machine instructions by the processor, experience a change in at least one physical and measurable property, such as a voltage, current, charge, phase, pressure, weight, height, tension, level, gap, position, velocity, momentum, force, temperature, polarity, magnetic field, magnetic force, magnetic orientation, reflectivity, molecular linkage, molecular weight, etc., thereby directly tying the specific machine instructions to the logic gate's specific configuration and property(ies). In the context of an electronic computer, each such change in the logic gates creates a specific electrical circuit, thereby directly tying the specific machine instructions to that specific electrical circuit.

DEFINITIONS

When definitions are provided for terms used substantively herein, those definitions apply throughout this document and until amended. Such terms and definitions are presented without prejudice, and, consistent with the application, the right to redefine these terms via amendment during the prosecution of this application or any application claiming priority hereto is reserved. For the purpose of interpreting a claim of any patent that claims priority hereto, each definition in that patent functions as a clear and unambiguous disavowal of the subject matter outside of that definition.

NOTE

Still other substantially and specifically practical and useful embodiments will become readily apparent to those skilled in this art from reading the above-recited and/or herein-included detailed description and/or drawings of certain exemplary embodiments. It should be understood that numerous variations, modifications, and additional embodiments are possible, and accordingly, all such variations, modifications, and embodiments are to be regarded as being within the scope of this application.

Thus, regardless of the content of any portion (e.g., title, field, background, summary, description, abstract, drawing figure, etc.) of this application, unless clearly specified to the contrary, such as via explicit definition, assertion, or argument, with respect to any claim, whether of this application and/or any claim of any application claiming priority hereto, and whether originally presented or otherwise:

there is no requirement for the inclusion of any particular described or illustrated characteristic, function, activity, or element, any particular sequence of activities, or any particular interrelationship of elements;

any elements can be integrated, segregated, and/or duplicated;

any activity can be repeated, any activity can be performed by multiple entities, and/or any activity can be performed in multiple jurisdictions; and any activity or element can be specifically excluded, the sequence of activities can vary, and/or the interrelationship of elements can vary.

Moreover, when any number or range is described herein, unless clearly stated otherwise, that number or range is approximate. When any range is described herein, unless clearly stated otherwise, that range includes all values therein and all subranges therein. For example, if a range of 1 to 10 is described, that range includes all values therebetween, such as for example, 1.1, 2.5, 3.335, 5, 6.179, 8.9999, etc., and includes all subranges therebetween, such as for example, 1 to 3.65, 2.8 to 8.14, 1.93 to 9, etc.

When any claim element is followed by a drawing element number, that drawing element number is exemplary and non-limiting on claim scope.

Any information in any material (e.g., a United States patent, United States patent application, book, article, etc.) that has been incorporated by reference herein, is only incorporated by reference to the extent that no conflict exists between such information and the other statements and drawings set forth herein. In the event of such conflict, including a conflict that would render invalid any claim herein or seeking priority hereto, then any such conflicting information in such material is specifically not incorporated by reference herein.

Accordingly, every portion (e.g., title, field, background, summary, description, abstract, drawing figure, etc.) of this application, other than the claims themselves, is to be regarded as illustrative in nature, and not as restrictive.

What is claimed is:

1. A method comprising:

automatically polling each of a plurality of provider edge routers with bidirectional forwarding detection protocol messages from a central routing device of a plurality of central routing devices, each of the plurality of provider edge routers without ability to communicate via interior gateway protocol, wherein the plurality of central routing devices communicate using the interior gateway protocol to disseminate routing information among the plurality of central routing devices;

automatically determining a suspected failure of a provider edge router of the plurality of provider edge routers; and automatically transmitting a report to each of the plurality of provider edge routers from the central routing device, the report indicative of the suspected failure of the provider edge router, each of the plurality of routers capable of changing a route of at least one forwarded packet responsive to the report;

wherein each of the plurality of provider edge routers automatically determines that the provider edge router has failed responsive to a receipt of signals from a majority of the plurality of central routing devices of the suspected failure of the provider edge router.

2. The method of claim 1, further comprising:

automatically polling the provider edge router to identify a repair of the suspected failure.

3. The method of claim 1, further comprising:

automatically polling the provider edge router to identify a repair of the suspected failure; and responsive to a receipt of an acknowledgement from the provider edge router, automatically reporting to each of the plurality of provider edge routers that the suspected failure is repaired.

4. A method comprising:

automatically transmitting a report to each of a plurality of provider edge routers from a central routing device of a plurality of central routing devices, wherein the report is indicative of a suspected failure of a provider edge router of the plurality of provider edge routers, wherein the central routing device automatically polls each of the plurality of provider edge routers with bidirectional forwarding detection protocol messages, wherein each of the plurality of provider edge routers does not communicate via interior gateway protocol messages, wherein the plurality of central routing devices communicate using the interior gateway protocol to disseminate routing information among the plurality of central routing devices, and wherein each of the plurality of provider edge routers automatically determines that the provider edge router has failed responsive to a receipt of signals from a majority of the plurality of central routing devices of the suspected failure of the provider edge router.

5. The method of claim 4, further comprising:

automatically determining the suspected failure of the provider edge router.

6. The method of claim 4, further comprising:

automatically polling the provider edge router to identify a repair of the suspected failure.

7. The method of claim 4, further comprising:

automatically polling the provider edge router to identify a repair of the suspected failure; and responsive to a receipt of an acknowledgement from the provider edge router, automatically reporting that the provider edge router is operational.

8. A system comprising:

a processor of a central routing device of a plurality of central routing devices, wherein the processor automatically causes a transmission of a report to each of plurality of provider edge routers, wherein the report is indicative of a suspected failure of a provider edge router of the plurality of provider edge routers, wherein the central routing device automatically polls each of the plurality of provider edge routers with bidirectional forwarding detection protocol messages, wherein each of the plurality of provider edge routers does not communicate via interior gateway protocol messages, wherein the plurality of central routing devices communicate using the interior gateway protocol to disseminate routing information among the plurality of central routing devices, and wherein each of the plurality of provider edge routers automatically determines that the provider edge router has failed responsive to a receipt of signals from a majority of the plurality of central routing devices of the suspected failure of the provider edge router.

9. The system of claim 8, further comprising:

automatically polling the provider edge router to identify a repair of the suspected failure.

10. The system of claim 9, further comprising:

automatically reporting to each of the plurality of provider edge routers that the suspected failure is repaired in response to a receipt of an acknowledgement from the provider edge router.

11. The system of claim 8, further comprising:

a network comprising the central routing device and the plurality of provider edge routers.

12. The system of claim 8, wherein:

each of the plurality of provider edge routers automatically changes a route of at least one forwarded packet responsive to the suspected failure.

13. A non-transitory machine-readable medium comprising machine-implementable instructions for activities comprising:

automatically determining that a second provider edge router has failed, and therefore become a suspected failure, responsive to a receipt of signals from a majority of a plurality of central routing devices of the suspected failure of the second provider edge router;

wherein a first provider edge router and the second provider edger router are without ability to communicate via interior gateway protocol messages;

wherein a central routing device of a plurality of central routing devices transmits a report of the suspected failure to the first provider edge router;

wherein the central routing device polls each of the plurality of provider edge routers with bidirectional forwarding detection protocol messages, wherein the plurality of central routing devices communicate using the interior gateway protocol to disseminate routing information among the plurality of central routing devices; and at the first provider edge router of a plurality of provider edge routers, automatically changing a route of at least one forwarded packet responsive to the received report of the suspected failure of a second provider edge router of the plurality of provider edge routers which was derived from receipt of signals from the majority of the plurality of central routing devices of the suspected failure of a second provider edge router.

* * * * *